(No Model.) 2 Sheets—Sheet 1.
P. W. MINOR.
BELT GUIDE AND TIGHTENER.
No. 463,686. Patented Nov. 24, 1891.
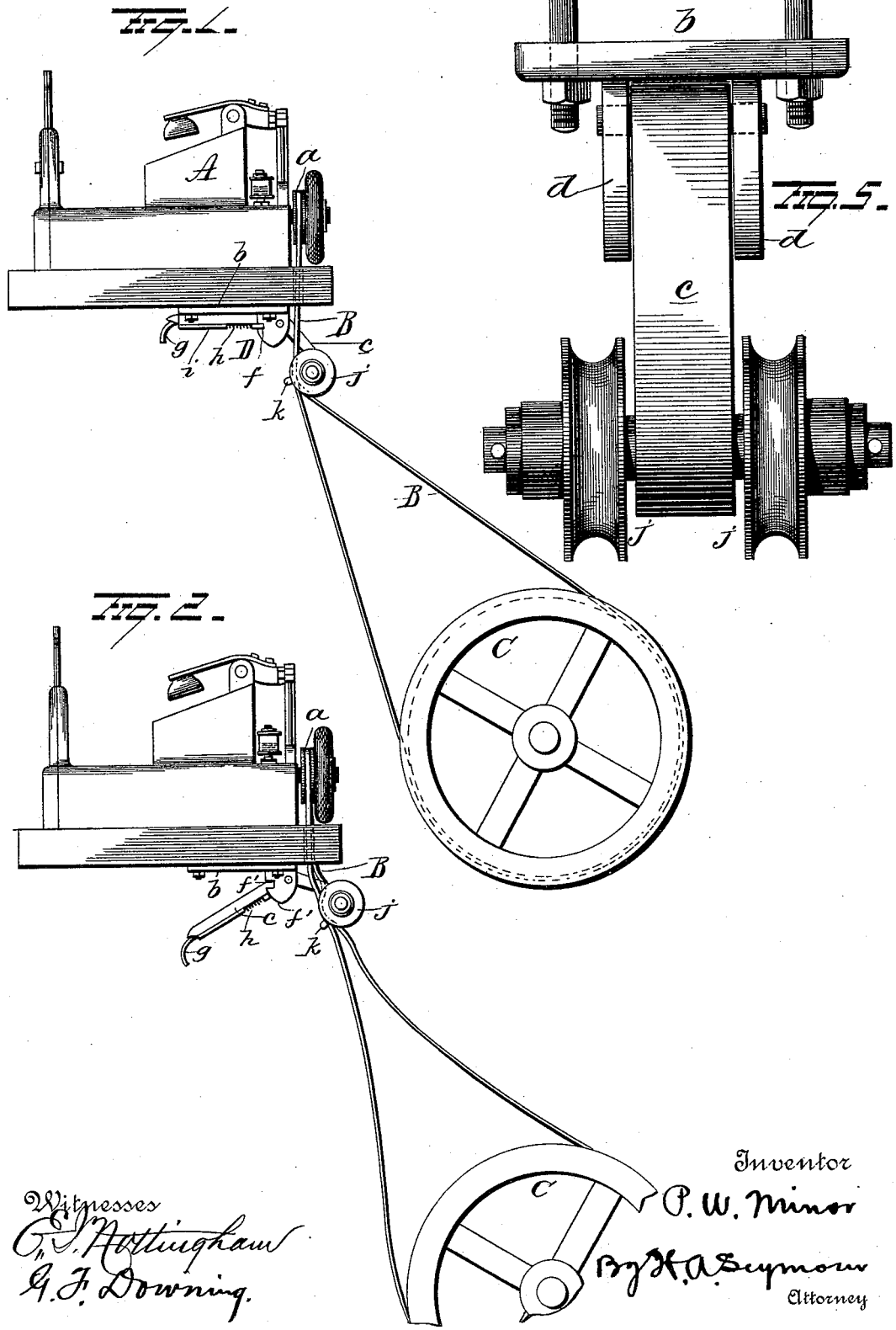
Witnesses
C. S. Nottingham
G. F. Downing.
Inventor
P. W. Minor
By H. A. Seymour
Attorney
THE NORRIS PETERS CO., PHOTO-LITHO., WASHINGTON, D. C.

(No Model.) 2 Sheets—Sheet 2.
P. W. MINOR.
BELT GUIDE AND TIGHTENER.

No. 463,686. Patented Nov. 24, 1891.

Witnesses
E. H. Nottingham
G. F. Downing

Inventor
P. W. Minor
By H. A. Seymour
Attorney

THE NORRIS PETERS CO., PHOTO-LITHO., WASHINGTON, D. C.

UNITED STATES PATENT OFFICE.

PETER W. MINOR, OF SPRINGVILLE, NEW YORK.

BELT GUIDE AND TIGHTENER.

SPECIFICATION forming part of Letters Patent No. 463,686, dated November 24, 1891.

Application filed August 4, 1891. Serial No. 401,661. (No model.)

*To all whom it may concern:*

Be it known that I, PETER W. MINOR, of Springville, in the county of Erie and State of New York, have invented certain new and useful Improvements in Belt Guides and Tighteners; and I do hereby declare the following to be a full, clear, and exact description of the invention, such as will enable others skilled in the art to which it appertains, to make and use the same.

My invention relates to an improvement in a combined belt-guiding device and tightener.

In a variety of machines, such as sewing and eyeleting machines, &c., it is in some cases necessary, and in other instances desirable, to locate the driving-pulley on the machine at right angles to the pulley on the main shaft from which it takes its power and in a plane to one side of the pulley on the main shaft, and in order to so locate the parts it is necessary to provide means for guiding the belt to make the right-angle change in the transmission of the power. Again, these machines are usually started by shifting the belt from a loose to a fast pulley and stopped by shifting it onto the loose pulley, and are generally run by round belts and grooved pulleys. The operators, who are generally girls, find it troublesome and dangerous to shift the belt, as the belt has to be raised over the edge of the pulley; and the object of my invention is to provide a simple device for guiding the belt from the driving-shaft to a pulley on the machine, and for tightening and loosening the belt for starting and stopping the machine.

My invention consists in the parts and combinations of parts, as will be more fully described, and pointed out in the claims.

Figure 3:
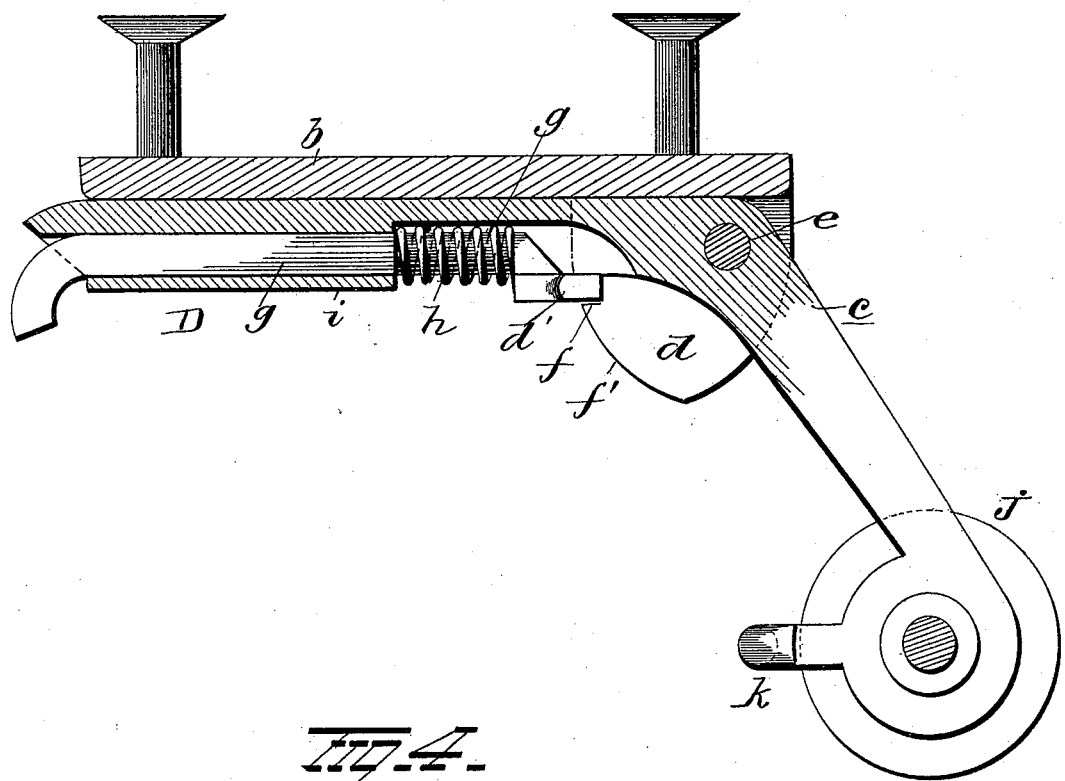
Figure 4:
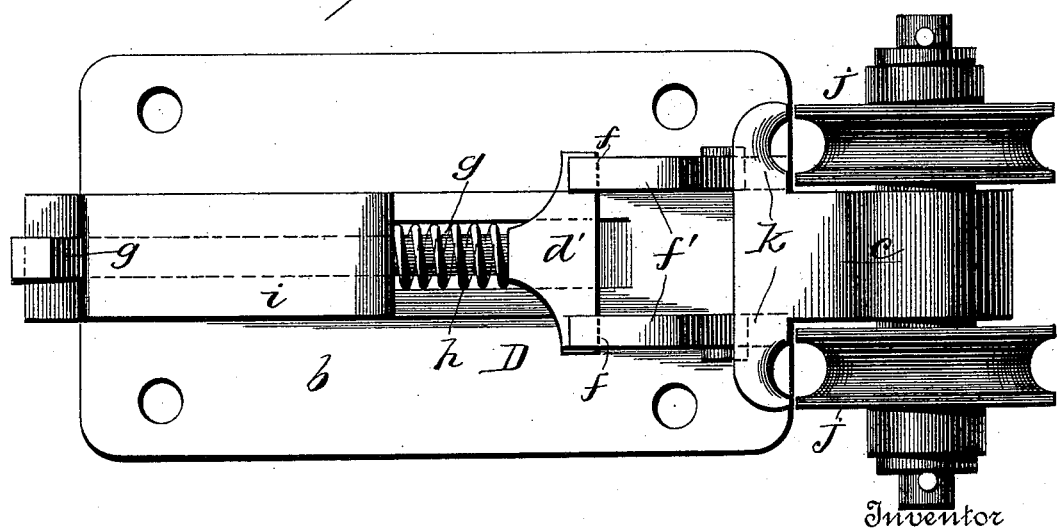

In the accompanying drawings, Figure 1 is a view in elevation showing my invention applied to a shoe-beading machine. Fig. 2 is a similar view showing the belt slack, and Figs. 3, 4, and 5 are detached views of my improved device.

A represents a machine having a pulley $a$ thereon and actuated by belt B, driven by large pulley C. The large pulley C is located at right angles to pulley $a$, and hence it is essential to provide devices for guiding the belt while making the right-angle change. The pulley C is located in a plane to one side of a vertical plane passing through pulley $a$, and the belt B is of such length that when the combined guiding device and tightener D is released or unlocked, as shown in Fig. 2, the belt will be sufficiently loose or slack to permit the pulley C to revolve thereon without moving the belt, and when the device D is locked, as shown in Fig. 1, all the slack is taken up.

The device D consists, essentially, of a plate $b$, secured to the under side of the machine-table, and a bent or bell-crank lever $c$, pivoted to said plate and carrying devices for locking the lever in one position and devices at its free end for guiding the belt. The plate $b$ is provided, preferably, with holes for the passage of fastening screws or bolts, and also near one end with two projecting lips $d$, between which the bell-crank lever $c$ is pivoted. This lever is pivoted at its elbow by pin $e$, and the rear faces of the lips $d$ are provided with slots $f$ and are curved at $f'$, preferably in the arc of a circle concentric with the pin $e$. The lower side of the horizontal or handle portion of the lever is grooved for the reception of the sliding rod $g$, which latter is provided on its end adjacent to the lips $d$ with a tongue $d'$, which latter, when the handle portion of the lever is horizontal, registers with and enters the slots $f$ and locks the lever in the position shown in Fig. 1, the tongue being forced therein by the spring $h$, which latter encircles rod $g$ and bears against the rear face of the tongue $d'$ and against the plate $i$, which latter is secured to the lower face of the lever and holds the rod in position. The outer end of the rod is turned downwardly-forming a finger-piece, by which it is operated. The opposite arm of the bell-crank lever is provided with trunnions carrying grooved pulleys $j$ and the curved fingers $k$, which latter rest in close proximity to the pulleys and hold the belt in place when the lever is in its unlocked position. The plate, with the lever thereon, is so situated relative to the pulley on the machine that when the lever is locked, as in Fig. 1, the fingers $k$, or, rather, the space between the fingers and the pulleys, rest approximately under the pulley on the machine. The belt runs under the pulleys, and as the latter are slightly separated and located at right angles to the driving-pulley it follows that there is no spreading of the belts and no tendency whatever for the belt to creep from the pulleys.

To stop the machine, it is simply necessary to grasp the finger-piece and pull rod $g$ until the tongue thereon leaves the slots. Then by depressing the handle portion of the lever the pulleys are moved upwardly until there is sufficient slack to permit the driving-pulley to rotate without carrying the belt. The fingers $k$ absolutely prevent displacement of the belt, and hence by simply elevating the handle end of the lever the wheels are forced against the belt, the latter tightened, and the machine started. The handle end of the lever can be sufficiently heavy to hold the pulleys elevated, or the friction of the tongue against the curved faces of the lips will be sufficient for this purpose.

By this device I am enabled to make a right or other angle change in the transmission of the power, and at the same time provide a device that can be quickly and easily actuated without danger for starting and stopping the machine.

It is evident that numerous slight changes in the constructive details might be resorted to without departing from the spirit and scope of my invention. Hence I would have it understood that I do not confine myself to the details shown, but consider myself at liberty to make such slight changes and alterations as fairly fall within the spirit and scope of my invention.

Having fully described my invention, what I claim as new, and desire to secure by Letters Patent, is—

1. The combination, with a bell-crank lever having two pulleys thereon near one end thereof, the said lever being pivoted at its elbow, of a spring-actuated catch for automatically locking the lever against movement, substantially as set forth.

2. The combination, with a bell-crank lever pivoted at its elbow and provided near one end with two pulleys and with curved fingers located adjacent to the pulleys, of a catch for locking the lever against movement.

3. The combination, with a bell-crank lever provided with pulleys at one end, and a spring-actuated catch, of lips having inclining edges upon which the catch bears, said lips having notches adapted to receive the catch, substantially as set forth.

In testimony whereof I have signed this specification in the presence of two subscribing witnesses.

PETER W. MINOR.

Witnesses:
F. W. LELAND,
H. W. TANNER.